United States Patent [19]

Cole

[11] 4,078,101
[45] Mar. 7, 1978

[54] FLAMEPROOFING OF TEXTILES

[75] Inventor: Robert Cole, Dudley, England

[73] Assignee: Albright & Wilson Ltd., Oldbury, England

[21] Appl. No.: 639,695

[22] Filed: Dec. 11, 1975

Related U.S. Application Data

[63] Continuation of Ser. No. 386,574, Aug. 8, 1973, abandoned.

[30] Foreign Application Priority Data

Aug. 11, 1972 United Kingdom ............... 37634/72

[51] Int. Cl.² .......................... C09K 3/28; C09D 5/18
[52] U.S. Cl. ..................................... 427/341; 252/8.1; 427/342
[58] Field of Search ................. 427/341, 342, 390 D; 8/116 P, 195; 106/15 FP; 252/8.1

[56] References Cited

U.S. PATENT DOCUMENTS

| 2,983,623 | 5/1961 | Coates ................................. 427/341 |
| 3,236,676 | 2/1966 | Coates et al. ..................... 427/382 X |
| 3,276,897 | 10/1966 | Reeves et al. ......................... 427/341 |
| 3,775,155 | 11/1973 | Eggenweiler et al. ............. 427/374 |
| 3,784,356 | 1/1974 | Wagner ........................... 427/341 X |

FOREIGN PATENT DOCUMENTS 938,989  10/1963  United Kingdom ................ 8/116 P

*Primary Examiner*—Harry J. Gwinnell
*Attorney, Agent, or Firm*—Flynn & Frishauf

[57] ABSTRACT

A process for flameproofing cellulosic textile fibres which comprises impregnating the fabric with an aqueous solution containing a pre-condensate of urea and a THP salt together with any excess of the THP salt necessary to make up a ratio of urea to THP lying between 0.05:1 and 0.25:1 molar, the solution being neutralized by the addition of an alkali or base to a pH in the range 5 to 8, and treating the impregnated fibres with ammonia to form a cross-linked polymer.

4 Claims, 1 Drawing Figure

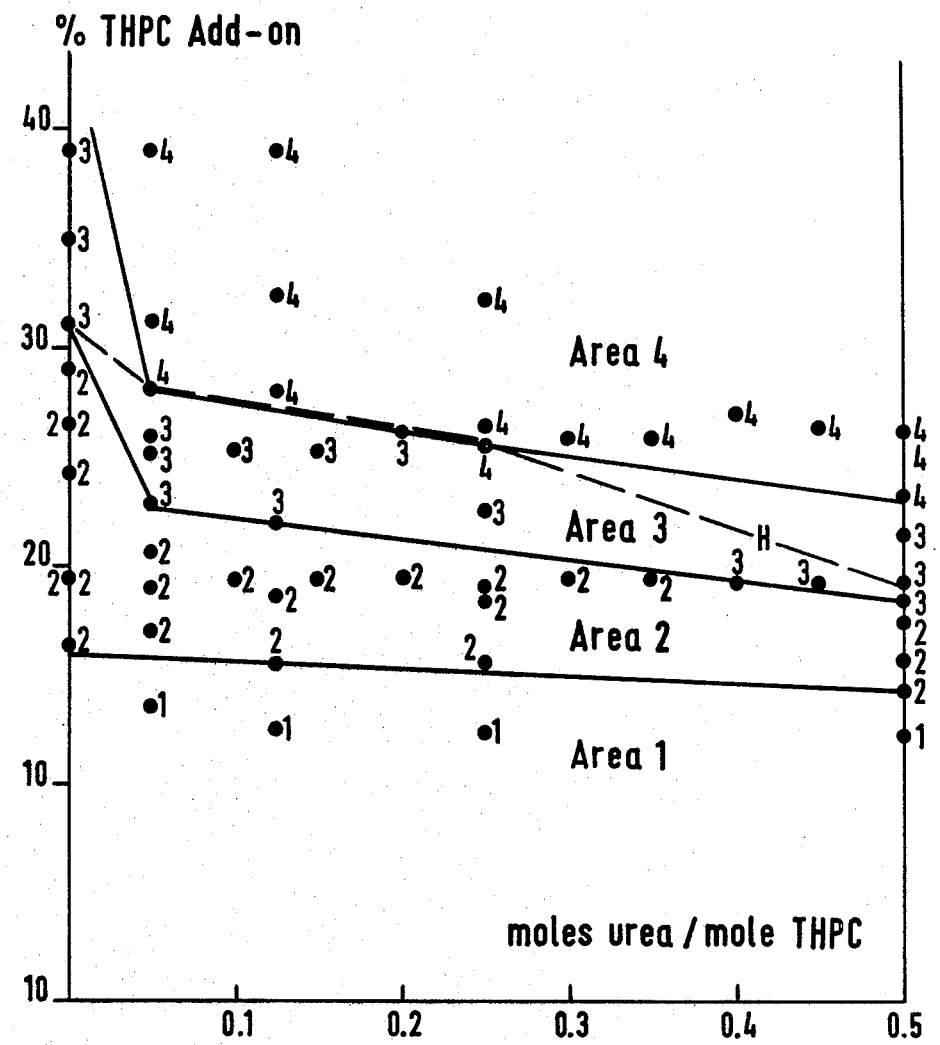

FLAMEPROOFING OF TEXTILES

This is a continuation of application Ser. No. 386,574, filed Aug. 8, 1973, now abandoned.

This invention relates to a treatment of cellulosic textile fibres to render them flame-resistant. Such treatments are referred to herein for convenience as 'flameproofing' treatments notwithstanding that they may not completely inhibit all flame formation. The treatment to which the invention relates is that in which fibres are impregnated with a precondensate of a tetrakis hydroxymethyl phosphonium salt such as the chloride (hereinafter called a THP salt or THPC in the case of the chloride) and a nitrogen-containing compound and are then treated with ammonia. In this way a cross-linked polymer is formed on the fibres and renders them flame-resistant.

An early disclosure of a flameproofing treatment involving the use of THPC and a nitrogen compound was U.K. patent specification No. 740,269, in which the cross-linking or curing of the polymer was effected by heat. In U.S. Pat. No. 2,772,188 it was proposed to cure the polymer by the use of ammonia, while U.K. patent specification No. 906,314 which corresponds to U.S. Pat. No. 2,983,623 describes the process, which eventually achieved commercial success, of applying the ammonia in two stages, first as gaseous $NH_3$ and second as aqueous ammonia. The result aimed at in this evolution was so to control the degree of cross-linking that the add-on of resin required for flameproofing did not unduly impair the handle of the textile. In addition it was desired to reach an acceptable degree of wash-fastness and this was substantially achieved by the two stage gaseous/aqueous method.

The best results in terms of a compromise between maximum flameproofing and softest handle have been obtained by using urea as the nitrogen compound and curing with ammonia. Heat curing of urea polymers is unsatisfactory and it would be necessary to use a compound of higher functionality such as melamine, or a mixture of melamine and urea, if heat curing were to be used, but in fact this method is not used since it results in fabric with a poor handle.

It has been assumed hitherto that if an ammonia cured urea/THPC resin is to be used, the correct proportions of urea to THPC are those in which these reactants appear in the pre-polymer which is to be cross-linked with the aid of ammonia, namely 0.5:1 molar. However two recent developments have led to difficulties in the use of this composition. The first is the desire to flameproof lighter fabrics than hitherto, the second the imposition of stricter flameproofing tests for certain goods. As regards the first, while the composition is satisfactory for fabrics of greater weight than say 4 oz per sq yd, if applied to lighter fabrics it may impair the handle to such an extent as to make the fabric unacceptable.

In order to deal with this problem attempts have been made to use ammonia-cured THPC alone, without the addition of a nitrogen compound such as urea. To make this possible, the THPC is first neutralised from its normal pH of about 3 to 7 by the addition of a suitable alkali or base. Such a process is the subject of U K patent specification No. 938,990, but some confusion has since arisen owing to the description of similar processes as having been carried out with 'THPOH'. In fact the existence of this specific compound in neutralised solutions of THPC is somewhat hypothetical, and we prefer to use simply the expression 'neutralised THPC'.

The flameproofing of textiles is governed in many countries by specifications issued from time to time by governmental bodies. Originally specifications generally in force were based on vertical strip tests such as British Standard (BS) 3119:1959. At the present time children's nightwear is governed by the following specifications: BS 2963:1958 in the U K and United States Specification FF3-71 in the USA. We have established that these latter tests are more severe than those previously used and that higher add-ons of THP-based flameproofing resins are required to meet these standards. This results in a firmer fabric handle, which may be unacceptable even for fabrics which could be satisfactorily treated under the original specifications.

The object of the present invention is to provide a flameproofing treatment which will meet all the above specifications without rendering the resulting fabric unacceptably stiff. It will be appreciated that these two requirements are opposed to each other and we have discovered that by varying the ratio of urea to THPC in the impregnating solution we can shift the result towards greater flame resistance or better handle, and that by selecting the ratio within certain limits a fabric acceptable on both counts can be obtained.

The invention consists in a process for flameproofing cellulosic textile fibers which comprises impregnating the fabric with an aqueous solution containing a precondensate of urea and a THPC salt together with any excess of the THPC salt necessary to make up a ratio of urea to THP lying between 0.05:1 and 0.25:1 molar, the solution being neutralised by the addition of an alkali or base to a pH in the range 5 to 8, and treating the impregnated fibres with ammonia to form a cross-linked polymer.

The impregnating solution for use in the invention may be made up by mixing the requisite quantities of urea and THPC in water and refluxing to cause them to react to form the pre-condensate. Alternatively a solution with a molar ratio of urea to THP salt of 0.5:1 may be refluxed and the necessary quantity of THPC to obtain the correct ratio of urea to THP added afterwards. However it is made, the solution is neutralised to a pH of 5 to 8, preferably 5.8 to 7. This is conveniently effected by adding caustic soda, but other alkalis such as sodium carbonate can be used. It will be understood that too high a pH may lead to instability of the solution, in which case a lower pH within the stated range is used.

The THP salt is normally the chloride, but other halides such as the bromide, or other salts such as the acetate the sulphate or phosphate, may be used.

The concentration of the solution of pre-condensate is preferably 20 to 40% by weight. Preferred values are 25 to 30%. It is convenient to make initially a solution of about 50% concentration, which is then diluted shortly before use. Preferably the neutralisation is effected at this stage rather than at the manufacturing stage.

The treatment with ammonia may be carried out by the two-stage gaseous/aqueous process referred to above. Alternatively the rapid gas cure method which is the subject of British Pat. Nos. 1,439,608 and 1,439,609 may be used.

A better understanding of the invention will be given by the following experimental results:

Five sets of solutions were made up, each set having a different value for the molar ratio of urea:THPC as follows:

(a) 0, (b) 0.05, (c) 0.125, (d) 0.25, (e) 0.5.

The solutions within each set had successively decreasing total contents of THPC in order to vary appropriately the add-on of THPC on the treated fabric. The most concentrated solution of each set was made by preparing a solution of a urea THPC pre-condensate (molar proportions 0.5:1) with excess THPC (except in the case of (e)) in such quantities that the total THPC content was 48% and the molar ratio of urea:THPC was that required for the set. Five parts of caustic soda per 100 parts of THPC was added to give a pH of 5.9. This solution as such, and diluted solutions obtained by adding successive quantities of about 10% of water made up the set.

Samples of a cotton winceyette fabric weighing 150 g per sq meter were padded in each solution of each set to approximately 80% wet pick-up and the THPC add-on as referred to below was calculated from the percentage of THPC in the solution and the wet pick-up. Each sample was dried at 85° C and then cured continuously by passing ammonia gas through the fabric at the rate of 25 l/minute. The samples were then washed for 30 minutes at 50° C in a solution of 4.5g/1 of synthetic detergent containing approximately 20% of sodium perborate, rinsed well and dried.

The samples were then tested according to the following flammability tests.

British Standard 3119:1959 A general test for flameproof fabrics using a conditioned specimen 12½ inches × 2 inches ignited by applying a standard 1½ inches high luminous flame for 12 seconds.

Department of Commerce FF3-71 Specified in the USA for children's sleepwear. A predried specimen held in a clamp which covers the vertical edges ignited by standard 1½ inches high luminous flame applied for 3 seconds.

British Standard 2963:1958 Method A Specified for Children's Nightwear in the U K. A free hanging strip of conditioned fabric 6 feet by 1½ inches is ignited by applying the standard 1½ inches high luminous flame for 12 seconds. This method gives erratic results with flame retardant treated in fabrics because the specimen is free to move in and out of the flame. The test was modified by using a shorter (15 inches) sample and by applying the igniting flame continuously to the lower edge of the specimen until it was ignited across the full width and immediately withdrawing the igniting flame (approximately 3 seconds).

The acceptance limits for the three tests were maximum char lengths on any specimen of 4½ inches on BS 3119, 7 inches on FF3-71 and 10 inches on BS 2963. Although it might appear that the severity of a particular test would be related to the permitted char length the reverse proved to be the case, since the use of a shorter ignition time favours the maintenance of the burning once the specimen has been ignited, whilst the provision of vertical edges as in BS 2963 permits the more rapid spread of flame. It is possible to class the treated fabric samples into 4 groups as follows:

FR Class 1 — Fail all three tests
FR Class 2 — Pass BS 3119 but fail FF3-71 and BS 2963
FR Class 3 — Pass BS 3119 and FF3-71 but fail BS 2963
FR Class 4 — Pass all three tests.

In addition the samples were graded for handle and were divided into two groups:

Group A — Fabric handle acceptable
Group B — Fabric handle excessively stiff.

Table I shows the results of the above in terms of THPC add-ons for the various gradings. (See over).

Table 1

| Set urea/ molar THPC | % THPC add-ons giving different Flame Resistance and Handle Gradings | | | | |
|---|---|---|---|---|---|
| | (a) 0 | (b) 0.05 | (c) 0.125 | (d) 0.25 | (e) 0.5 |
| FR Class 4 | | | | | |
| Handle B | — | 39.0, 32.2 | 38.9, 32.3 | 32.1 | 26.2, 23.1 |
| Handle A | — | 28.1 | 27.0 | 26.3 | |
| FR Class 3 | | | | | |
| Handle B | 39.0, 35.0 | — | — | — | 21.5 |
| Handle A | 32.2 | 25.1, 22.8 | 21.9 | 22.6 | 19.2 |
| FR Class 2 | | | | | |
| Handle A | 28.8, 26.4, 24.1, 19.6, 16.3 | 20.6, 17.0 | 18.6, 15.3 | 18.5, 15.7 | 17.6, 15.9, 14.2 |
| FR Class 1 | | | | | |
| Handle A | — | 13.6 | 12.6 | 12.6 | 12.2 |

In a further set of experiments solutions with various urea:THPC mole ratios and a concentration of total THPC of 32% were made up as described above and used to test samples of the same fabric in the same way. The samples were assessed for flame resistance and handle again in the same way as described above. The results in terms of THPC add-on, flame resistance and handle are shown in Table II. The whole was repeated using a series of solutions with a total THPC concentration of 24% and the results are shown in Table III. (See over).

Table Table II

| Urea/THPC Molar Ratio | % THPC Add-on | Flame Resistance Class | Handle Group |
|---|---|---|---|
| 0 | 26.5 | 2 | A |
| 0.05 | 25.7 | 3 | A |
| 0.1 | 25.1 | 3 | A |
| 0.15 | 25.1 | 3 | A |
| 0.2 | 26.1 | 3 | A |
| 0.25 | 25.6 | 4 | A |
| 0.3 | 25.9 | 4 | B |
| 0.35 | 25.9 | 4 | B |
| 0.4 | 27.0 | 4 | B |
| 0.45 | 26.5 | 4 | B |
| 0.5 | 25.2 | 4 | B |

Table III

| Urea/THPC Ratio | % THPC | Flame Resistance Class | Handle |
|---|---|---|---|
| 0 | 19.8 | 2 | A |
| 0.05 | 19.0 | 2 | A |
| 0.1 | 19.4 | 2 | A |
| 0.15 | 19.4 | 2 | A |
| 0.2 | 19.6 | 2 | A |
| 0.25 | 19.0 | 2 | A |
| 0.3 | 19.4 | 2 | A |
| 0.35 | 19.6 | 2 | A |
| 0.4 | 19.2 | 3 | A |
| 0.45 | 19.2 | 3 | A |
| 0.5 | 18.6 | 3 | A |

The results of Tables I, II, and III are shown graphically in the accompanying drawing, in which the abscissae represent molar ratios of urea:THPC and the ordinates the percentage THPC add-ons. The prints represent the figures in the Table and each is marked with its FR class number. The distribution of the points is such that the field can be divided into four areas as shown each corresponding with one of the FR classes. Curve H divided the field according to the handle of the respective samples, Group A (acceptable) lying below curve H and Group B (unacceptable) above the curve.

It will be seen that fabrics which pass all the flame resistance tests and have an acceptable handle are those treated with solutions in sets (b), (c) and (d), ie with molar ratios of urea to THPC of 0.05:1 to 0.25:1.

We claim:

1. A process for flameproofing cellulosic textile fabric which comprises impregnating the fabric with an aqueous solution containing a pre-condensate of urea and a tetrakis hydroxymethyl phosphonium salt together with any excess of the tetrakis hydroxymethyl phosphonium salt necessary to make up a ratio of urea to tetrakis hydroxymethyl phosphonium lying between 0.05:1 and 0.25:1 molar, the solution being neutralised by the addition of an alkali or base to a pH in the range 5 to 8, and treating the impregnated fibres with ammonia to form a cross-linked polymer.

2. A process as claimed in claim 1 in which the tetrakis hydroxymethyl phosphonium salt is the chloride.

3. A process as claimed in claim 2 in which the pH of the solution lies between 5.8 and 7.

4. A process as claimed in claim 1 in which the pH of the solution lies between 5.8 and 7.

* * * * *